Oct. 11, 1966 C. F. CARTER 3,278,081
METHODS AND APPARATUS FOR DISPENSING PARTICULATE MATERIAL
Filed Oct. 30, 1964 2 Sheets-Sheet 1
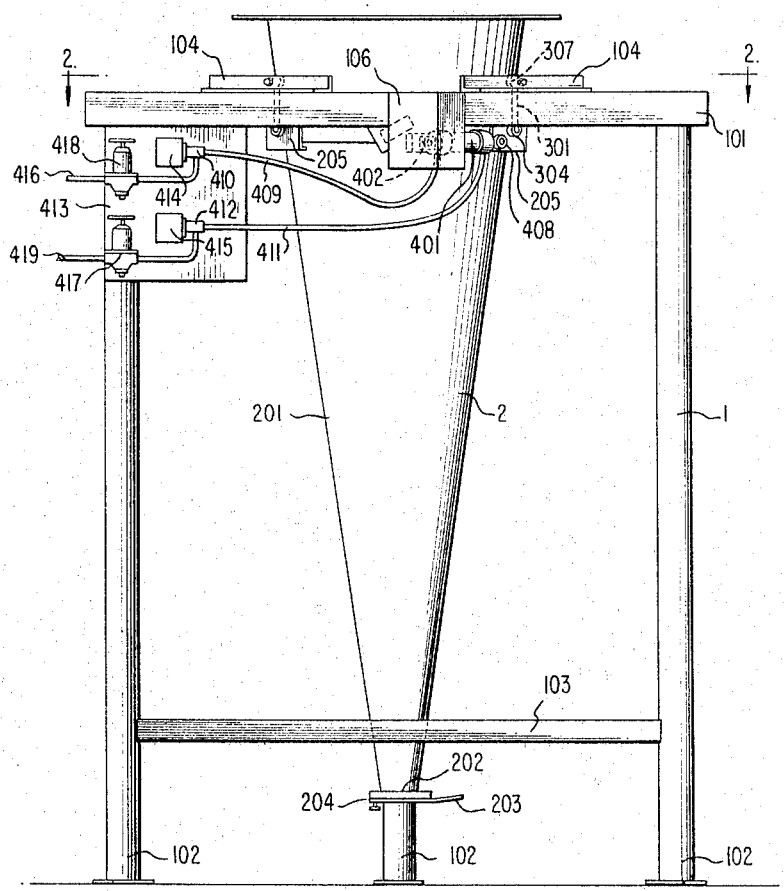
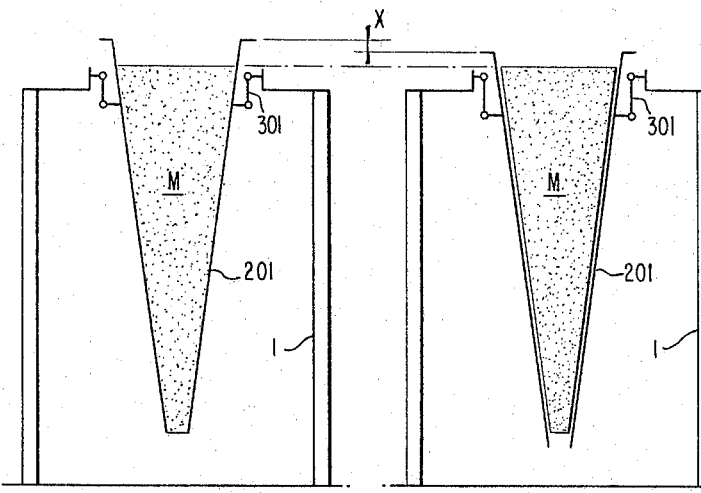
INVENTOR
CLARENCE F. CARTER

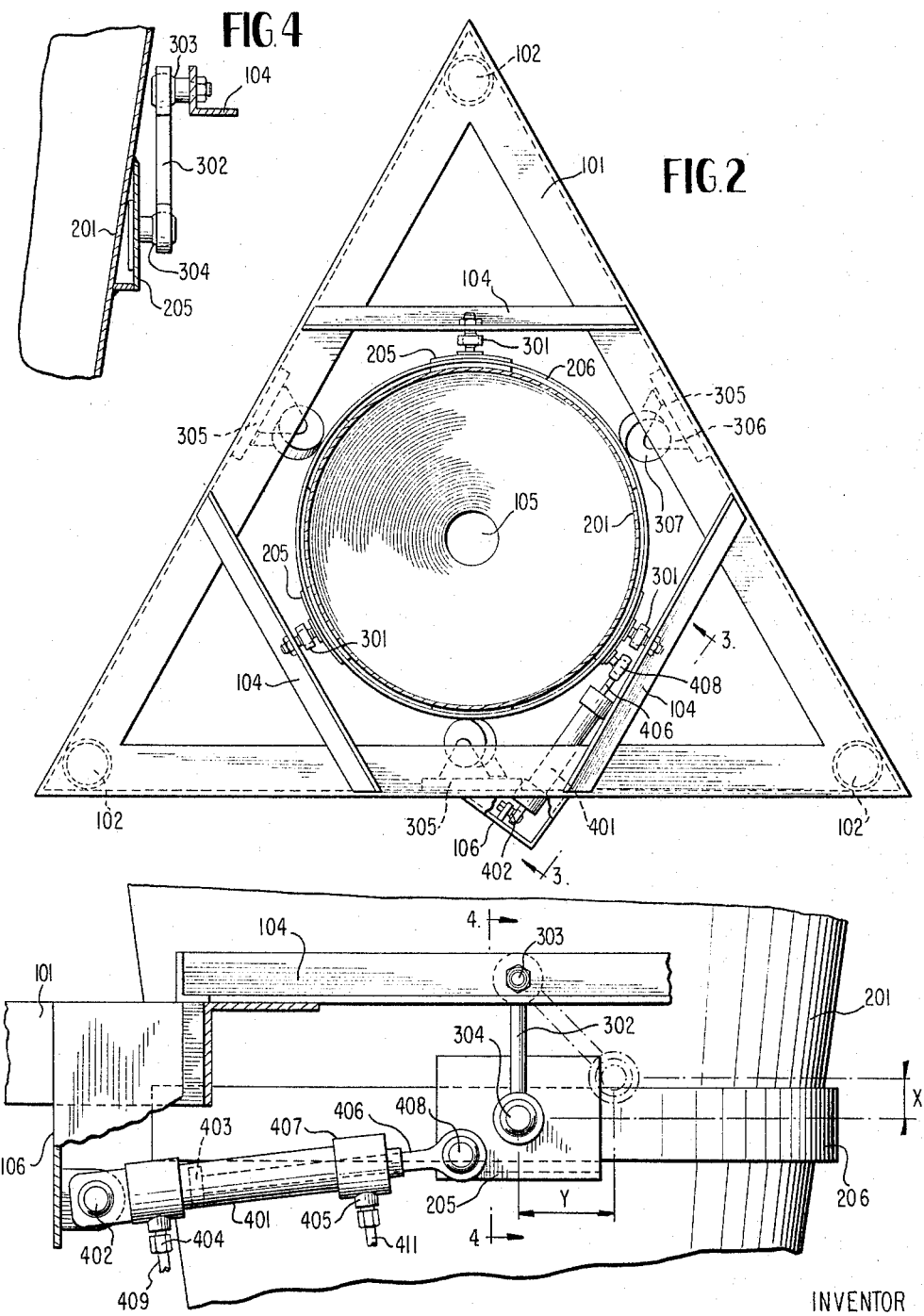

United States Patent Office

3,278,081
Patented Oct. 11, 1966

3,278,081
METHODS AND APPARATUS FOR DISPENSING
PARTICULATE MATERIAL
Clarence F. Carter, 123 N. Hazel St., Danville, Ill.
Filed Oct. 30, 1964, Ser. No. 407,695
11 Claims. (Cl. 222—1)

This invention pertains to methods and apparatus for dispensing particulate material. In particular, it relates to an innovation in the dispensing art which facilitates the dispensing of difficult to handle material.

A variety of techniques have heretofore been proposed for facilitating the dispensing of particulate material such as powders, or more granular material such as sand, from hopper-like structures.

In one previously developed technique, either an entire hopper or a lower hopper portion is agitated or otherwise vibrated on a cyclic basis. This technique, while often facilitating flow, tends to aerate or fluidize material so as to produce a decrease in the density of the mass of material being dispensed. This density decrease is not desirable, for example, where material is being dispensed for packaging purposes.

Other known techniques involve the introduction of air into a mass of material to facilitate its flow. Here again, a material mass, density decrease results which is undesirable for certain purposes.

In some instances, neither vibration nor aeration will effectively eliminate material clogging or bridging tendencies so as to obtain a desirable material flow.

In recognition of the deficiencies of previously developed methods and apparatus utilized in dispensing particulate material, it is an object of the present invention to provide new methods and apparatus which enable particulate materials to be dispensed without clogging or bridging and without undergoing any significantly adverse density decrease.

It is also an object of the invention to provide such methods and apparatus by means of which particulate material may be dispensed without being aerated or fluidized during the dispensing operation.

Yet another object of the invention is to provide such methods and apparatus which entail structural simplicity but operational reliability on a sustained basis.

It is also an object of the invention to provide such methods and apparatus which may be uniquely adapted to the indivdual characteristics of a variety of particulate materials to be dispensed.

In accomplishing the objects of this invention, there is presented an overall apparatus and method of dispensing, both of which entail individually significant aspects.

A significant aspect of the method for dispensing particulate material which is presented through this invention, entails the positioning of such material within containing means and the imparting of unique, cyclic sequences of movement to this containing means. Each such sequence includes a first period or increment wherein the containing means is moved with sufficient rapidity to cause it to move more rapidly than the mass of material contained therewithin, with the mass of material remaining as a substantially coherent, unitary body. Each sequence includes a second period or increment wherein the containing means is moved generally oppositely to the movement of the first increment. Particulate material is allowed to gravitate downwardly within the containing means and discharge through outlet means thereof.

Another aspect of the method invention involves a particular sequence of container means movements wherein, during the first increment of movement, the containing means is rotated about a vertical axis in one direction and simultaneously moved downwardly. During the second increment of movement, the containing means is rotated about a vertical axis in a direction opposite to the aforesaid one direction and is simultaneously moved upwardly. During the downward movement, the containing means is moved with such rapidity as to move out of contact with at least a portion of the mass of particulate material.

Another individually significant, method aspect of the invention involves the application of greater force to the container means to induce the aforesaid second increment of movement than is applied to the containing means to induce its first increment of movement.

Of additional method significance is an aspect of the invention entailing the provision of intervals between the sequences of container means movements, during which intervals the containing means is substantially at rest, i.e. in a dwell condition. These intervals are of such duration that the density of the mass of particulate material within the containing means is not decreased through continuous particle agitation. Preferably, these intervals are of sufficient duration to allow the mass of material within the containing means to substantially come to rest.

A more specific method aspect of the invention involves the provision of such dwell or rest intervals between sequences of containing means movements which are of a duration at least as long as the duration of each movement sequence.

Another individually significant method aspect of the invention involves the basic concept of applying cyclic sequences of movement to containing means from which particulate material is to be dispensed, during which sequences the containing means undergoes arcuate movement accompanied by transverse, linear movement.

Apparatus aspects of the invention involve combinations of means for performing the method aspects heretofore described.

An especially significant apparatus aspect of the invention relates to a preferred structural embodiment including an articulated linkage arrangement for supporting a dispensing hopper for both horizontal rotary and vertical linear movement.

Other apparatus aspects of the invention relate to a particularly effective piston and cylinder mechanism for imparting both arcuate and transverse linear movement to a hopper, control means for regulating the individual increments of each sequence of container means movements, and stabilizing means for confining the containing means to rotary movement about a particular axis.

In describing the invention reference will be made to preferred method and apparatus embodiments shown in the accompanying drawings.

In the drawings:

FIGURE 1 provides a schematic, elevational view of a hopper-like, particulate material dispensing apparatus adapted to undergo alternating horizontal rotary and vertical movement during a dispensing operation;

FIGURE 2 provides an enlarged, schematic, and horizontal sectional view of the FIGURE 1 apparatus as viewed along the section line 2—2 of FIGURE 1;

FIGURE 3 provides a still further enlarged, schematic and sectional view of a portion of the FIGURE 1 assembly as viewed along the section line 3—3 of FIGURE 2 and illustrating structural details of a double acting, piston and cylinder arrangement employed to impart cyclic movements to the material containing hopper;

FIGURE 4 provides an enlarged, transverse sectional view of a portion of the FIGURE 1 apparatus as viewed along the section line 4—4 of FIGURE 3 and illustrating structural details of one of a plurality of links which serves to interconnect the material containing hopper with its associated frame; and FIGURES 5a and 5b schematically illustrate the manner in which the hopper of the FIGURE 1 apparatus moves substantially away from the mass of particular material contained therewithin during a downward movement imparted to the hopper.

The apparatus illustrated in FIGURE 1 includes, as its principal components, a frame 1, a hopper 2, hopper supporting and suspending means 3, and hopper moving or operating means 4.

Frame means 1 as schematically shown in FIGURES 1 and 2, comprises a generally triangular frame portion 101 supported on three, upright, vertically extending legs 102. Legs 102 may be braced by components such as the frame member 103 shown in FIGURE 1.

Frame means 1 additionally includes three horizontally extending angle iron members 104 disposed generally as shown in FIGURE 2. As illustrated in FIGURE 2, angle irons 104 are connected to triangular frame 101 by conventional fastening means such as welding and are so oriented as to be equally spaced from the central frame axis 105 and mutually inclined to each other at equal angles.

Hopper means 2 is coaxial with the axis 105 and comprises a generally frustoconical body portion 201 which converges downwardly toward a material outlet 202. If desired, outlet 202 may be provided with a conventional, plate-like closure 203. Closure 203 may be mounted for horizontal pivotal movement on a conventional pivot joint 204.

Hopper supporting means 3 includes a plurality of movable link means 301. As illustrated in FIGURE 2, a link means 301 is associated with each of the hopper supporting angle irons 104. Each link means 301 extends between an angle iron 104 and a mounting bracket 205 formed on the side wall 201 of the hopper 2 as shown in FIGURES 3 and 4.

Each link means 301 includes a rigid body portion 302. A conventional ball joint 303 connects the upper end of each link body 302 to its associated angle iron 104 as schematically shown in FIGURE 4. Another conventional ball joint 304 connects the lower end of each link body 302 with a hopper bracket 205 as is also schematically shown in FIGURE 4.

In order to stabilize the hopper 2, three roller assemblies 305 are provided which are carried by the triangular frame 101. As shown in FIGURE 2 these assemblies 305 are engageable with an annular centralizing rim 206 carried by the hopper 2 and coaxial with axis 105. Each roller assembly 305 includes a bracket 306 which carries a conventionally supported, rotatable disc or roller 307. As shown, each roller 307 is mounted on its bracket 306 for rotation about an axis which is inclined so as to be generally perpendicular to the movement path of the adjacent portion of the hopper rim 206.

As will be apparent, the engagement of the rollers 307 with the hopper rim 206 will serve to stabilize the hopper 2 to rotation about the central frame axis 105 which coincides with the central axis of the hopper 2.

As will be appreciated, the combined supporting effect of the links 302 and the ball joints 303 and 304 will be such as to enable the hopper 2 to undergo rotary and simultaneous vertical movements. In other words, when the hopper 2 is rotated about the axis 105, the displacement of the links 302 will of necessity induce concurrent, vertical movement of the hopper 2.

As will be appreciated, the rotary hopper movement occurs in a direction having a generally horizontal vector component.

Hopper moving or operating means 4 includes a double acting cylinder and piston including a cylinder 401. This cylinder is connected at one end through means of a conventional ball joint 402, with a bracket 106 depending downwardly from triangular frame portion 101 as shown in FIGURES 1, 2 and 3. A piston 403 is mounted within cylinder 491 for slidable movement between pressurized fluid inlet couplings 404 and 405. A piston rod 406 extends from piston 403 through a cylinder head 407 and terminates in connected relation with a conventional ball joint 408. Ball joint 408 may be secured to one of the three hopper brackets 205 as shown in FIGURE 3 so as to operably connect the piston 403 with the hopper 2.

A pressurized fluid conduit 409 extends from the cylinder coupling 404 to a flow controlling, cyclically operable, conventional, and commercially available, flow controlling valve 410. Valve 410 may be of the electrically operable, solenoid type. Another pressurized fluid conduit 411 extends from cylinder coupling 405 to another cyclically operable, conventional, and commercially available flow controlling valve 412. Valve 412 may also be of the solenoid type. Valves 410 and 412, as schematically shown in FIGURE 1 are associated with conventional control means 413, which determines the cyclic operation of the valves 410 and 412 and may be electrically actuated. Devices included in the control means 413 include conventional timing means 414 for regulating and actuating the cycle of opening and closing of the valve 410 and additional, conventional timing means 415 for regulating and actuating the cycle of opening and closing of the valve 412.

With this arrangement the valves 410 and 412 will be cyclicly and alternately opened and closed to apply fluid pressure, at the desired cycle pattern, to opposite ends of cyclinder 401. This selectively variable application of pressure will induce the desired cyclic rate of movement of the hopper 2.

Pressurized fluid such as air may be supplied to valve 410 for transmittal to conduit 409 through means of a conventional supply conduit 416. Similarly, pressurized air may be supplied to valve 412 for transmittal to conduit 411 through means of a conventional supply conduit 417. Conduits 416 and 417 may extend to conventional pump means, not shown, which supplies pressurized air.

The pressure of air flowing through conduit 416 may be selectively and independently regulated by a conventional and schematically shown, manually adjustable pressure regulator 418. Similarly, the pressure of air flowing through conduit 417 may be independently and selectively regulated by a conventional, manually adjustable pressure regulator 419.

With this arrangement, the sequence of alternating sliding movements of the piston 403 may be regulated so as to impart the desired sequences of movement to the hopper 2.

In the contemplated mode of operation of the apparatus, each sequence of hopper movements will be initiated with the links 301 in the inclined, phantom line position shown in FIGURE 3. With the links 301 in this position, the piston rod 406 will be in its extended position relative to its cylinder 401.

During the first increment of hopper movement, the piston rod 406 is contracted into the cylinder 401, i.e. moved toward the pivot mount 402, so as to cause the hopper 2 to rotate in a clockwise direction, when the apparatus is viewed as shown in FIGURE 3, and concurrently move downwardly. During a succeeding, second increment of movement of each movement sequence, the piston rod 406 is re-extended so as to cause the hopper to move generally opposite to the movement of its first increment, i.e., counterclockwise and upward.

As will be apparent, the length of the links 301, the stroke of the piston 403, and mounting of the cylinder 401 relative to the frame 1, may be selected so as to obtain the desired vertical increment X of hopper movement and the desired horizontal increment Y of hopper rotary displacement. With any given link length and piston stroke, the position of the pivot mount 402 may be selected so as to obtain the desired increments of hopper movements and ratio between these movements.

By adjusting the pressure control mechanism 418, the pressure of fluid supplied to the coupling 404 may be established at a desired level. Similarly, the pressure of fluid supplied to the coupling 405 may be selectively regulated by adjusting the pressure control mechanism 417. In this fashion, the force transmitted by the piston 403 to the hopper 2, while the piston 403 moves in one direction, may be selectively adjusted so as to be different from the force transmitted by this piston to the hopper when it is moving in its opposite direction.

For example, it may be desirable while moving the hopper 2 upwardly to supply a greater hopper moving force than that employed to cause downward hopper movement in order to offset the inertial resistance of the hopper and its load to a lifting action. In this connection, however, it will be noted that, with the arrangement shown in FIGURE 3, when air pressurized at the same level is supplied to the couplings 404 and 405, the force transmitted to the piston rod 403 to cause the rod to move outwardly of the cylinder 401 so as to raise the hopper 2, will be greater than the force applied to the hopper when fluid is supplied to the coupling 405 so as to induce downward hopper movement. This difference in force, of course, results from the presence of the piston rod 406 which reduces the effective, fluid reactive area of the piston 403 on the side of this piston away from the pivot joint 402. Thus, with this arrangement, it may not be necessary to increase the pressure of air supplied to the coupling 404 in order to obtain an adequate hopper lifting force.

Cycle controlling mechanisms 414 and 415 may be adjusted in a conventional fashion, depending upon the type of commercially available device employed, so as to cause the cyclic opening of the valve 410 and simultaneous closing of the valve 412, and the cyclic closing of the valve 410 and simultaneous opening of the valve 412. With valve 410 closed and valve 412 open, the piston 403 will be urged toward the pivot mount 402 so as to induce the first increment of hopper movement. With valve 410 open and valve 412 closed, the piston 403 will be urged away from the pivot mount 402 so as to induce the second increment of hopper movement.

As will be appreciated, when each of the valves 410 and 412 are in their closed positions, the flow of pressurized fluid from the supply source through these valves will be interrupted. In a conventional fashion, however, when the valve 410 is closed, the conduit 409 may be vented to the atmosphere through the valve structure and when the valve 412 is closed, the supply conduit 411 may be vented to atmosphere through the structure of this valve. This arrangement insures that when pressurized air is being supplied to one end of the piston 403, the other end of the piston will be exposed to the atmosphere so as to facilitate unimpeded piston action.

As will be apparent, the timing mechanisms 414 and 415 may be appropriately regulated so that the length of each of the two increments of hopper movements may be individually adjusted and appropriate dwell intervals provided between these intervals. During such dwell periods, the control means 413 will serve to hold the operating means 403 inoperative, i.e. at rest.

With the apparatus components having been described, the manner in which these components may be employed to dispense particulate material will now be considered.

In describing the sequence of movements of the container means 2, it will be understood, of course, that the timing mechanisms 414 and 415 and the pressure regulators 418 and 419 will have been appropriately adjusted in a conventional fashion. Such adjustments will produce the necessary cyclic sequence of movements of the hopper driving piston 403 with the desired application of hopper moving forces.

It will also be understood that the sequence of piston movements and the applied forces may be selectively tailored to the characteristics of each particulate material to be dispensed, with the sequence and applied force being determined by experience and observation.

Each sequence of movement of the hopper is initiated by the first increment of movement during which the hopper 2 is moved downwardly and rotated horizontally. With the apparatus component arrangement illustrated in the drawings, the hopper 2 will be rotated clockwise during its downward movement. This movement results from the piston 403 moving toward the pivot joint 402 so as to move the hopper supporting links 301 from the phantom to the solid line positions shown in FIGURE 3.

During this downward movement, the hopper is rotated and moved downwardly more rapidly than the rate of movement of the mass of particulate material within the hopper induced by the hopper movement. During this rapid movement, the particulate mass M will remain substantially as a coherent or integral conical body and the container will undergo a rotary movement with respect to the mass. This differential movement, which prevents particle accumulation on the hopper wall, is consequence of the inertia of the mass of material and the rapidity with which the hopper 2 is moved.

With the hopper 2 disposed at the beginning of each sequence as shown in FIGURE 5a, the downward movement of the hopper 2 will occur with such rapidity that the hopper wall 201 will move away from a substantial part or all of the conical mass M of particulate material within the hopper 2 as schematically shown in FIGURE 5b. At or subsequent to the end of the downward stroke of hopper 2, or possibly at some point during the downward stroke, the mass M will move down into engagement with the hopper wall 201. The impact of engagement of this mass with the hopper wall will tend to compact the particulate material and thus maintain a low density of the material or even acomplish an increase in density of the mass M.

At the end of the first increment of movement, with the links 301 disposed in vertically extending alignment as shown in FIGURE 3, a substantially instantaneous reversal of pressure applied to the piston 403 may occur so that a rapid reversal in piston movement is induced and the second increment of hopper movement initiated. This rapid reversal desirably will occur while the mass M is still undergoing rotary movement as a result of its inertia and the rotary thrust initially applied to the mass during the first part of the first increment of hopper movement when the mass was in overall contact with the wall 201. There will thus be obtained an augmented shearing effect between the hopper wall 201 and the mass M so as to further minimize the possibility of material sticking to the hopper wall.

Under the piston 403 moving away from the pivot joint 402 during the second increment of container means movement, the hopper 2 will be caused to undergo vertical upward and rotary movement. With the illustrated arrangement of components, the hopper will be rotated in a counterclockwise direction while being raised.

As before noted, when fluid is applied to the coupling 404 under the same pressure as fluid supplied to the coupling 405, the force acting on the piston 403 to cause movement of the piston away from the pivot 402 will exceed the force applied to the piston 403 during the first increment. Thus, during the upward stroke of the container 2, the container will be motivated by a greater force than that employed to move the container downwardly. However, even with this difference in motivating force, the container 2, during the second increment (or upward movement) may move more slowly than during the first increment (or downward movement) because of the inertial resistance of the mass M to a lifting effect.

During the second increment of hopper movement, i.e. the hopper moves upwardly at a relatively slow rate, a relatively long duration of the second increment relative to the first increment will be produced. This will tend to insure a longer period of frictional interaction of the hopper wall 201 with the mass M than that which occurred during the first increment. As a result, the rotary force transmitted to the mass M during the second increment may tend to exceed that applied during the first increment if the second increment is sufficiently prolonged.

At the end of the second increment of hopper movement, when the linkages 301 have been restored to the phantom line position shown in FIGURE 3, the piston 403 will be held immobile during a dwell period so as to substantially immobilize the hopper 2. This dwell period should be of such duration as to allow any rotary motion of the mass M induced by rotary movement of the container 2 to cease. In practice, a dwell period has been utilized which is as long as or longer than the combined duration of both increments of movement of each movement sequence of the container of the hopper 2.

The overall effect of the sequence of movements heretofore described is the obtaining of a smooth, uninterrupted flow of particulate material through the hopper outlet 202. It has been observed in practice that, with such a sequence of hopper movements, substantially no material sticks to the hopper walls and no appreciable or discernible bridging of material occurs within the hopper 2. Of particular significance is the fact that the material density tends to increase during the dispensing operation through de-aeration rather than tending a decrease as it would with vibratory dispensers which induce particulate material aeration or fluidization. The hopper movements relative to the frame are effectively stabilized through the link supporting and roller centralizing arrangements.

Where the hopper 2, during the first increment of movement, undergoes rotary movement more rapid than that which it undergoes during the second movement increment, it is possible that the mass M of material may tend to rotate in an incremental fashion within the hopper 2 in the direction of rotary movement of the hopper 2 involved during the second increment. This results from the previously noted greater application of rotary force to the mass M during the second increment. Such a progressive movement of the material mass may further tend to offset the possibility of material sticking to the hopper wall during the dispensing operation.

This invention has been effectively employed in dispensing such difficult to handle material as carbon black having a particle size on the order of 3 to 5 microns.

In dispensing this material a hopper was utilized such as that generally illustrated in FIGURE 1 wherein the open, upper end of the hopper had an internal diameter on the order of about two feet and the hopper had an axial length on the order of about six feet. In this hopper, the inner diameter of the outlet at the lower end of the hopper was on the order of about two or three inches.

The drive piston 403 was actuated so that during the first increment of movement, the period of downward and rotary hopper movement involved about three fourths of a second. During the second increment of hopper movement, while the hopper was rotating in a direction opposite to the rotary direction of the first increment and simultaneously moving upward, the period of time required for this increment of movement was about one and one quarter seconds. Between the termination of a second increment and the initiation of a subsequent first increment, the drive piston remained at rest for a period of about three seconds so that the hopper dwelled substantially at rest for about three seconds allowing, of course, for the usual minor vibrations associated with the interrupting of hopper movement.

The length of each link body 302, the initial positioning of the link 302 as shown in phantom line in FIGURE 3, and the stroke of the piston 403 was such as to cause a horizontal, rotary displacement X of each pivot joint 304 of about 2¾ inches and a vertical displacement Y of about one inch. During each movement of the hopper, each pivot joint 304 moved through a stroke path of about three inches in length.

With this dispensing arrangement, finely divided carbon black was effectively dispensed at a consistently accurate rate with clogging and bridging of this material within the hopper being effectively avoided. Aeration or fluidization of the carbon black during the dispensing operation was effectively avoided so as to maintain a desired high density of the material mass during the dispensing operation. It was observed that the material did not tend to stick or accumulate on the hopper walls so as to impede the dispensing operation.

While the invention has been described with reference to preferred method and apparatus embodiments, those skilled in the dispensing art and familiar with the disclosure of this invention will at once recognize the broad applicability of the invention. For example, either an entire hopper or a lower hopper portion may be caused to undergo some or all of the sequential movements as hereinbefore described so as to obtain some or all of the advantages of the invention. Where only a hopper portion is caused to undergo movement, it will be understood that, in a conventional fashion, the movable hopper portion will be connected with the stationary hopper portion by flexible wall means so as to avoid the transmission of forces to the stationary hopper portion.

It will also be apparent that containing means structures, frame structures, drive mechanisms, and control mechanisms, differing from those hereinbefore described may be effectively employed in the practice of the invention.

Additions, deletions, substitutions and other modifications with reference to the disclosed embodiments may well be apparent to those skilled in the art which would fall within the purview of the invention as defined in the appended claims.

I claim:
1. An apparatus for dispensing particulate material, said apparatus comprising:
    frame means;
    material containing means comprising frustoconical wall means converging downwardly toward a material outlet;
    a plurality of link means connecting said material containing means to said frame means for both rotary and vertical movement relative thereto, each of said link means including,
        a rigid body portion;
        first ball joint means at one end of said rigid body portion for connecting said rigid body portion with said frame means, and
        second ball joint means at the other end of said rigid body portion for connecting said rigid body portion with said material containing means;
    fluid actuated, piston and cylinder means adapted to impart movement sequences to said material containing means including downward movement accompanied by a horizontal rotary movement in one direction and upward movement accompanied by a horizontal rotary movement in a direction opposite to said one direction, said piston and cylinder means including cylinder means connected with said frame means and piston means connected with said material containing means.

2. A method of dispensing particulate material, said method comprising:
    positioning particulate material within containing means;
    imparting cyclic sequences of movement to said containing means;
    during a first period of each cyclic sequence, moving said containing means generally downward with sufficient rapidity to cause said containing means to to move more rapidly than the mass of material contained therewithin with the mass of material remaining substantially coherent;

during a second period of each cyclic sequence, moving said containing means generally upward;

causing said downward movement of said containing means to occur with such rapidity that said containing means moves downwardly more rapidly than the mass of particulate material contained therewithin and moves out of contact with at least a portion of said substantially coherent mass;

abruptly contacting said substantially coherent mass with the interior of said containing means between said first and second periods; and causing said particulate material within said containing means to gravitate downwardly while simultaneously, progressively laterally constricting, said material; and discharging said material through outlet means carried by said containing means.

3. A method of dispensing particulate material, said method comprising:

positioning particulate material within containing means;

imparting cyclic sequences of movement to said containing means;

during a first period of each cyclic sequence, moving said containing means with sufficient rapidity to cause said containing means to move more rapidly than the mass of material contained therewithin with the mass of material remaining substantially coherent;

during a second period of each cyclic sequence, moving said containing means generally oppositely to the movement of said first period;

providing intervals between said sequences of container means movements during which said containing means is substantially at rest, said intervals being of such duration that the density of the mass of particulate material within said containing means is not decreased through continuous particle agitation; and allowing particulate material within said containing means to gravitate downwardly and discharge through outlet means carried by said containing means.

4. A method as described in claim 3 wherein said intervals between said sequences of containing means movement are of such duration as to allow the mass of material contained therewithin to substantially come to rest.

5. A method of dispensing particulate material, said method comprising:

positioning particulate material within containing means;

imparting cyclic sequences of movement to said containing means;

during a first period of each cyclic sequence, moving said containing means with sufficient rapidity to cause said containing means to move more rapidly than the mass of material contained therewithin with the mass of material remaining substantially coherent;

during a second period of each cyclic sequence, moving said containing means generally oppositely to the movement of said first period;

selectively regulating the commencement of each of said first periods;

selectively regulating the commencement of each of said second periods, independent of the regulation of the commencement of said first periods;

selectively regulating the movement inducing force applied to said containing means during each of said first periods;

selectively regulating the movement inducing force applied to said containing means during each of said second periods, independent of the regulation of movement inducing force applied to said containing means during said first periods;

allowing particulate material within said containing means to gravitate downwardly and discharge through outlet means carried by said containing means.

6. A method of dispensing particulate material, said method comprising:

positioning particulate material within containing means;

imparting cyclic sequences of movement to said containing means;

during a first period of each cyclic sequence, moving said containing means with sufficient rapidity to cause said containing means to move more rapidly than the mass of material contained therewithin with the mass of material remaining substantially coherent;

during a second period of each cyclic sequence, moving said containing means generally oppositely to the movement of said first period;

selectively and independently regulating the duration of each of said first and second periods;

selectively and independantly regulating the movement inducing force applied to said containing means during each of said first and second periods;

allowing particulate material within said containing means to gravitate downwardly and discharge through outlet means carried by said containing means; and providing intervals between said sequences of container means movements during which said containing means is substantially at rest, said intervals being of such duration that the density of the mass of particulate material within said containing means is not decreased through continuous particle agitation.

7. A method as described in claim 6 wherein, during each cyclic sequence, said containing means is caused to undergo downward movement of such rapidity that said containing means moves downwardly more rapidly than the mass of particulate material contained therewithin and moves out of contact with at least a portion of said mass.

8. A method of dispensing particulate material, said method comprising:

positioning particulate material within containing means;

imparting cyclic sequences of movement to said containing means;

during a first period of each cyclic sequence, moving said containing means so that it is rotated about a vertical axis in one direction and simultaneously moved downwardly;

during a second period of each cyclic sequence, moving said containing means so that it is rotated about a vertical axis in a direction opposite to said one direction and simultaneously moved upwardly;

said downward movement of said containing means during said first period of movement being with such rapidity that said containing means moves downwardly more rapidly than the mass of particulate material contained therewithin and moves out of contact with at least a portion of said mass, with greater force being applied to said containing means to induce said second period of movement than is applied to said containing means to induce said first period of movement;

providing intervals between said sequences of container means movements during which said containing means is substantially at rest, said intervals being of such duration that the density of the mass of particulate material within said containing means is not decreased through continuous particle agitation, with said intervals between said sequences of containing means movement being of such duration as to allow the mass of material contained therewithin to substantially come to rest, and being of a duration at least as long as the duration of each movement sequence; and allowing particulate material within said containing means to gravitate downwardly and discharge through outlet means carried by said containing means.

9. An apparatus for dispensing particulate material, said apparatus comprising:

frame means;

material containing means having outlet means toward which particulate material is adapted to gravitate;

connecting means supporting said containing means on said frame means for movement relative thereto;

operating means for applying movement inducing forces to said containing means thereby imparting cyclic sequences of movement to said containing means, said operating means including, means adapted to cause said containing means to undergo a first movement, and means adapted to cause said containing means to undergo a second movement generally oppositely to said first movement;

means adapted to selectively regulate the commencement of each of said first movements;

means adapted to selectively regulate the commencement of each of said second movements, independent of the regulation of the commencement of said first movement;

means adapted to selectively vary the movement inducing force applied by said operating means to said containing means to induce each of said first movements; and means adapted to selectively vary the movement inducing force applied by said operating means to said containing means to induce each of said second movements, independent of the varying of the movement inducing force applied by said operating means to said containing means to induce said first movements.

10. An apparatus for dispensing particulate material, said apparatus comprising:

frame means;

material containing means having outlet means toward which particulate material is adapted to gravitate;

connecting means supporting said containing means on said frame means for movement relative thereto;

operating means for applying movement inducing forces to said containing means thereby imparting cyclic sequences of movement to said containing means, said operating means including, means adapted to cause said containing means to undergo a first movement, and means adapted to cause said containing means to undergo a second movement generally oppositely to said first movement;

first means adapted to selectively and independently vary the duration of each of said first and second movements;

second means adapted to selectively and independently vary the movement inducing force applied by said operating means to said containing means to induce each of said first and second movements; and control means for maintaining said operating means cyclicly inoperative so as to provide intervals between said sequences of container means movements during which said containing means is substantially at rest, said intervals being of such duration that the density of the mass of particulate material within said containing means is not decreased through continuous particle agitation.

11. An apparatus for dispensing particulate material, said apparatus comprising:

frame means;

material containing means having outlet means toward which particulate material is adapted to gravitate;

connecting means supporting said containing means on said frame means for movement relative thereto;

operating means for imparting cyclic sequences of movement to said containing means, said operating means including, means adapted to cause said containing means to undergo a first movement, and means adapted to cause said containing means to undergo a second movement generally oppositely to said first movement; and control means for maintaining said operating means cyclicly inoperative so as to provide intervals between said sequences of container means movements during which said containing means is substantially at rest, said intervals being of such duration that the density of the mass of particulate material within said containing means is not decreased through continuous particle agitation.

References Cited by the Examiner
UNITED STATES PATENTS 3,178,068  4/1965  Dumbaugh _____ 222—161

ROBERT B. REEVES, *Primary Examiner.*

N. L. STACK, *Assistant Examiner.*